United States Patent
Jurng et al.

(10) Patent No.: US 7,998,445 B2
(45) Date of Patent: Aug. 16, 2011

(54) METHOD AND APPARATUS FOR THE TREATMENT OF NITROGEN OXIDES USING AN OZONE AND CATALYST HYBRID SYSTEM

(75) Inventors: Jong Soo Jurng, Seoul (KR); Ju Young Jeong, Goyang-si (KR); Sung Min Chin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 12/639,783

(22) Filed: Dec. 16, 2009

(65) Prior Publication Data
US 2010/0239480 A1    Sep. 23, 2010

(30) Foreign Application Priority Data
Mar. 17, 2009    (KR) .................. 10-2009-0022412

(51) Int. Cl.
*B01D 51/56*    (2006.01)
(52) U.S. Cl. ................... 423/239.1; 423/219
(58) Field of Classification Search .............. None
See application file for complete search history.

(56) References Cited

U.S. PATENT DOCUMENTS

| | | | | |
|---|---|---|---|---|
| 6,162,409 | A * | 12/2000 | Skelley et al. | 423/239.1 |
| 2004/0141890 | A1 * | 7/2004 | Hirata et al. | 422/186.04 |
| 2005/0084436 | A1 * | 4/2005 | Suchak et al. | 423/242.1 |
| 2006/0062709 | A1 * | 3/2006 | Cho et al. | 423/239.1 |
| 2006/0284102 | A1 * | 12/2006 | Blanchard | 250/423 F |
| 2007/0189949 | A1 * | 8/2007 | Hsieh et al. | 423/235 |

FOREIGN PATENT DOCUMENTS

KR    10-2004-0106640    12/2004

* cited by examiner

*Primary Examiner* — Melvin C Mayes
*Assistant Examiner* — Sheng H Davis
(74) *Attorney, Agent, or Firm* — Jones Day; Christopher C. Bolten

(57) ABSTRACT

The present invention is a method of treating nitrogen oxides using an ozone and catalyst hybrid system, as well as an apparatus, specifically relating to a method of treating nitrogen oxide using an ozone and catalyst hybrid system comprising: 1) removing moisture from the nitrogen oxide polluted air to be treated; 2) contacting the moisture-removed nitrogen oxide polluted air with ozone to oxidize NO in said polluted air to $NO_2$; 3) reacting the residual ozone with a catalyst to generate oxygen radicals and then, reacting the oxygen radicals with the nitrogen oxide polluted air from step 2) to oxidize $NO_2$ in the polluted air to $NO_3^-$. The nitrogen oxide treatment method and apparatus according to the present invention can effectively treat harmful nitrogen oxides, such as NO, $NO_2$, using an ozone and catalyst hybrid system at room temperature without requiring a high temperature reaction or an ammonia gas as a reducing agent. In addition, the method and apparatus according to the present invention can be useful in the removal of nitrogen oxides in various areas because they can prevent secondary air pollution resulting from the use of ozone.

5 Claims, 5 Drawing Sheets

METHOD AND APPARATUS FOR THE TREATMENT OF NITROGEN OXIDES USING AN OZONE AND CATALYST HYBRID SYSTEM

The present application claims priority to Korean Patent Application No. 10-2009-22412, filed on Mar. 17, 2009, the subject matter of which is incorporated herein by reference in its entirety.

FIELD OF THE INVENTION

The present invention relates to a method and an apparatus for effectively treating harmful nitrogen oxides, such as NO, $NO_2$, etc., using a combination of ozone and a catalyst.

BACKGROUND OF THE INVENTION

Nitrogen oxides ($NO_x$) generally refer to a variety of compounds comprising oxygen and nitrogen, such as nitrogen monoxide (NO), nitrogen dioxide ($NO_2$), nitrous oxide ($N_2O$), dinitrogen tetroxide ($N_2O_4$), dinitrogen pentoxide ($N_2O_5$), etc. In particular, NO and $NO_2$, which account for most of nitrogen oxides in exhaust gas, are not only the main cause for acid rain along with sulfur oxides ($SO_x$), but are air pollutants that induce photochemical smog.

Methods for removing such nitrogen oxides can be largely divided into a wet method and a dry method. Wet methods are advantageous in removing both nitrogen oxides and sulfur oxides and are generally used in processes where nitrogen oxide is produced in a small amount. However, in the wet process, because NO has low water solubility, it should be oxidized to $NO_2$ preceding absorption in the liquid solution. Such a conversion process is problematic since it involves high costs and may produce $N_2O_3$ and $N_2O_4$ as by-products resulting in potential water pollution.

The major dry processes for nitrogen oxides are the selective non-catalytic reduction (SNCR) method and the selective catalytic reduction (SCR) method. The SNCR method selectively reduces nitrogen oxides to nitrogen and water by injecting only ammonia at a high temperature between 850 and 1050° C. in the absence of a catalyst. The SCR method involves the use of gaseous ammonia as a reducing agent and a catalyst to reduce nitrogen oxides to nitrogen and water at a relatively low temperature (150-450° C.).

The SNCR method has the advantage of removing more than 50% of nitrogen oxides at a relatively low cost, but emitted, unreacted ammonia forms ammonium salts, which may clog up the end part of the reactor or cause corrosion. Further, due to the narrow operation temperature range, there are difficulties in commercializing the process. As a result, the SCR method is now being regarded as the most advanced, safest, and most cost effective technology for treating nitrogen oxides. This method has the advantage of having a nitrogen oxide removal ratio of 90% or higher and does not require any additional post-treatment processes. In SCR processes, catalyst performance is the key factor. Thus, various types of catalysts for SCR processes have been suggested, ranging from precious metal catalysts to base metal catalysts. Of the catalysts developed so far, vanadium-based catalysts using titanium oxide ($TiO_2$) as a support have been most widely used in actual processing. A SCR process using a vanadium-based catalyst employing $TiO_2$ as a support is a very efficient technology for converting $NO_x$ to $N_2$ at a temperature of around 350° C. However, because the catalyst can be worn, exchanged, and toxic, the process has the problem of decreased $NO_x$ conversion ratios or side-reactions, such as oxidization of reducing agents prior to the removal reaction. Furthermore, in SCR processes, gaseous ammonia may trigger oxidization to lower the catalyst performance when the reaction temperature is above 450° C., or nitrogen oxides may be regenerated from the gaseous ammonia. If the reaction temperature is less than 150° C., the gaseous ammonia may react with moisture in the exhaust gas to form ammonium nitrate or ammonium sulfate, thereby hampering the process.

As a result, there is a need for a simple nitrogen oxide treatment method with high efficiency that can resolve the above-mentioned problems in the SCR process which uses gaseous ammonia as a reducing agent.

SUMMARY OF THE INVENTION

It is thus an object of the present invention to provide a method of effectively treating nitrogen oxides such as NO and $NO_2$, using an ozone and catalyst hybrid system, and an apparatus for the same.

The nitrogen oxide treatment method using an ozone and catalyst hybrid system according to an embodiment of the present invention involves the steps of:

1) removing moisture from the nitrogen oxide polluted air to be treated;

2) contacting the moisture-removed nitrogen oxide polluted air with ozone to oxidize NO in the polluted air to $NO_2$; and 3) reacting residual ozone with a catalyst to generate oxygen radicals, and at the same time reacting the generated oxygen radicals with the nitrogen oxide polluted air from step 2) to oxidize $NO_2$ in the polluted air to $NO_3^-$.

The nitrogen oxide treatment apparatus using an ozone and catalyst hybrid system according to another embodiment of the present invention includes:

a water trap that removes moisture contained in the nitrogen oxide polluted air to be treated;

an ozone generator that generates ozone;

an ozone reaction chamber in which the nitrogen oxide polluted air reacts with the ozone supplied from said ozone generator to oxidize NO to $NO_2$; and a catalytic reaction chamber in which the nitrogen oxide polluted air and residual ozone are transferred from said ozone reaction chamber, said ozone is decomposed into oxygen radicals by a catalyst, and $NO_2$ contained in said polluted air is contacted with the oxygen radicals to be oxidized to $NO_3^-$.

The nitrogen oxide treatment using an ozone and catalyst hybrid system according to the present invention can completely, or substantially completely, remove nitrogen oxides by initially oxidizing nitrogen oxides by reacting with ozone, and oxidizing for a second time the nitrogen oxides by the oxygen radicals produced when the residual ozone is oxidized.

In addition, since the catalyst reaction may in some embodiments be carried out at room temperature, the nitrogen oxide treatment according to the present invention can be conducted under simple processing conditions and its operation costs are also very low. Furthermore, since the ozone is completely, or substantially completely, decomposed by the catalyst during processing, there is substantially no risk of secondary air pollution, and thus the present invention can be used in the treatment of harmful nitrogen oxides emitted from industrial facilities, interior residential environment, roads, underground parking lots, tunnels, etc.

DETAILED DESCRIPTION OF THE INVENTION

Hereinafter, the nitrogen oxide treatment method using an ozone and catalyst hybrid system according to the present invention will be described in detail in a step-by-step manner.

Step 1) involves the removal of moisture from the nitrogen oxide polluted air to be treated.

Carrying out such a removal step may ensure smooth catalyst performance during subsequent nitrogen oxide treatment using an ozone and catalyst hybrid system according to the present invention. The moisture contained in the nitrogen oxide polluted air may be removed using silica gels capable of absorbing moisture or a moisture-removing device, such as a dryer, etc. It is desirable to remove moisture such that the moisture content of the nitrogen oxide polluted air is 0.1-1.0%.

Step 2) is initial oxidization by ozone where the nitrogen oxide polluted air whose moisture has been removed in step 1) is contacted with ozone to oxidize NO in the polluted air to $NO_2$.

Nitrogen oxides in the air are mainly composed of NO and $NO_2$, where NO is relatively inactive and its treatment is difficult. In addition, if NO and $NO_2$ co-exist in the air to be treated, a catalyst for each is required for the treatment. Thus, the present invention includes reacting NO in nitrogen oxide polluted air with ozone to initially oxidize NO to $NO_2$, followed by treating the nitrogen oxide polluted air which only, or substantially only, contains $NO_2$.

In general, ozone is widely known as a colorless gas with a peculiar odor and has a very high oxidation potential. It is an allotrope of pure oxygen which is heavier than air and where oxygen ($O_2$) and elemental oxygen (O) are unstably combined, and gradually decomposes into oxygen at room temperature. Ozone is advantageous in blocking harmful ultraviolet rays, decomposing agricultural chemicals and heavy metals, sterilization, deodorization, air cleaning, etc. Therefore, ozone has general daily applications, as well as eco-friendly applications.

In step 2), ozone is generated using an ozone generator, such as an ultraviolet lamp, dielectric-barrier discharge, cold plasma, etc. The ozone is supplied in an amount not less than the sum of the minimum amount required for oxidizing NO to $NO_2$ in step 2) and the minimum amount required for oxidizing $NO_2$ to $NO_3^-$ in step 3) below. More specifically, ozone is supplied in a concentration exceeding the sum of a two-fold concentration of NO in the nitrogen oxide polluted air to be treated and the concentration of $NO_2$, based on a stoichiometric ratio. This is because if NO in the nitrogen oxide polluted air reacts with ozone at a 1:1 ratio to be oxidized to $NO_2$ according to Scheme 1 below, in addition to the $NO_2$ originally contained in the nitrogen oxide polluted air, $NO_2$ oxidized from the above reaction makes the total concentration of $NO_2$ increase as much as the concentration of NO. Accordingly, in order to produce oxygen radicals necessary for oxidizing $NO_2$ to $NO_3^-$ at a later stage and considering the concentration of NO to be oxidized to $NO_2$ as well as the concentration of $NO_2$, ozone should be injected in an excess amount, specifically in an amount exceeding the sum of a concentration not less than the sum of a two-fold concentration of NO in the nitrogen oxide polluted air to be treated and the concentration of $NO_2$. Accordingly, the minimum concentration of ozone to be supplied can be calculated based on Equation 1 below:

$$NO + O_3 \rightarrow NO_2 + O_2 \quad \text{[Scheme 1]}$$

$$Y = 2A + B \quad \text{[Equation 1]}$$

wherein Y represents the concentration of ozone to be supplied, A represents the concentration of NO contained in nitrogen oxide polluted air, and B represents the concentration of $NO_2$ contained in nitrogen oxide polluted air following oxidation of NO to $NO_2$.

Step 3) is directed to the secondary oxidization by oxygen radicals. In this step, the nitrogen oxide polluted air from step 2) above is reacted with the residual ozone, where the ozone is decomposed into oxygen and oxygen radicals, and the thus obtained oxygen radicals are reacted with the nitrogen oxide polluted air to oxidize $NO_2$ in the polluted air to $NO_3^-$.

In step 3), the residual ozone from the reaction with NO in the nitrogen oxide polluted air in step 2) first reacts with a catalyst to be decomposed into oxygen and oxygen radicals. Suitable catalysts include any catalyst known to decompose ozone into oxygen and oxygen radicals, such as catalysts based on $MnO_2$, NiO, CoO, CuO, $Fe_2O_3$, $V_2O_5$, $AgO_2$. These catalysts may be used in a single metal oxide form as above or in the form of, e.g. $MnO_2$—CuO, $MnO_2$—$AgO_2$, NiO—CoO—$AgO_2$. In one embodiment of the present invention, $MnO_2$ is used as a catalyst for the residual ozone from step 2).

Subsequently, the oxygen radicals produced from reacting the residual ozone and catalyst react with the nitrogen oxide polluted air only, or substantially only, containing $NO_2$ via the primary oxidization by ozone to oxidize $NO_2$ to $NO_3^-$.

Step 3) described above is represented as Scheme 2 below. This step is carried out at a temperature of 0-100° C., for example at room temperature of 10-30° C.

$$NO_2 + MnO_2 + O_3 \rightarrow NO_2 + MnO_2 + O^* + O_2 \rightarrow NO_3^- + MnO_2 + O_2 \quad \text{[Scheme 2]}$$

The cleaned air in which nitrogen oxides have been removed, or substantially removed, in step 3) is emitted as it is or reacted with water to remove $NO_3^-$ from the cleaned air in the form of $HNO_3$.

As described above, the nitrogen oxide treatment method using an ozone and catalyst hybrid system according to the present invention can almost completely remove nitrogen oxides by initially oxidizing NO in the polluted air to $NO_2$ by ozone, followed by oxidizing $NO_2$ by oxygen radicals produced from the reaction of ozone and a catalyst.

The nitrogen oxide treatment method according to the present invention provides the following characteristics.

In general, the residual ozone from the oxidization reaction acts as another air pollutant. In the present invention, however, since ozone is completely, or substantially completely, decomposed by the catalyst during the treatment processing, the finally emitted cleaned air substantially does not contain any ozone and thus there is substantially no risk of secondary air pollution by using ozone.

In addition, the conventional SRC methods are carried out using gaseous ammonia as a reducing agent at a high temperature of 150-400° C., whereas the treatment method according to the present invention can almost completely remove nitrogen oxides at room temperature without the aid of a reducing agent such as gaseous ammonia.

Further, the treatment method according to the present invention, as long as the concentration of ozone supplied is controlled according to the concentration of the nitrogen oxide polluted air to be treated, can be usefully applied in the treatment of low concentration of nitrogen oxide polluted air emitted from interior residential environment, as well as in the treatment of high concentration of nitrogen oxide polluted air emitted from industrial facilities such as power plants, incinerators, and chemical plants.

The present invention also provides an apparatus for treating nitrogen oxides using an ozone and catalyst hybrid system comprising:

a water trap that removes moisture contained in the nitrogen oxide polluted air;

an ozone generator in which ozone is generated;

an ozone reaction chamber in which the moisture-removed nitrogen oxide polluted air is reacted with the ozone supplied from said ozone generator to oxidize NO to $NO_2$; and a catalytic reaction chamber in which the nitrogen oxide polluted air and residual ozone are transferred from said ozone reaction chamber, said ozone is decomposed into oxygen radicals by a catalyst, and $NO_2$ contained in said polluted air is contacted with oxygen radicals to be oxidized to $NO_3^-$.

Hereinafter, the nitrogen oxide treatment apparatus according to the present invention will be described in detail with reference to the drawings.

Figure 1:
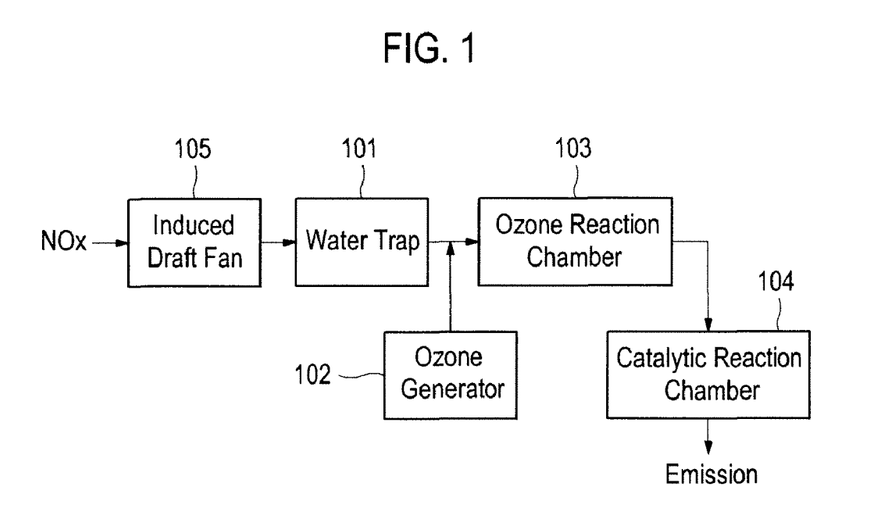
FIG. 1 is a schematic diagram of the nitrogen oxide treatment apparatus in accordance with the present invention.

FIG. 1 is a schematic diagram of the nitrogen oxide treatment apparatus according to the present invention.

The nitrogen oxide polluted air injected through an induced draft fan (105) that is designed to be oriented toward the site where nitrogen oxides are emitted is first transferred to a water trap (101) for removal of moisture from the polluted air. The removal of moisture from the nitrogen oxide polluted air through a water trap (101) is essential for ensuring smooth catalyst performance during nitrogen oxide treatment using an ozone and catalyst hybrid according to the present invention. The water trap (101) may be filled with a drying agent, such as silica gels or equipped with a partial removal device such as a dryer. It is desirable to remove the moisture such that the nitrogen oxide polluted air contains moisture in an amount of, for example, 0.1-1.0%.

The nitrogen oxide polluted air where moisture has been removed by the water trap (101) is transferred to an ozone reaction chamber (103). Simultaneously, ozone generated from an ozone generator (102) is supplied to the ozone reaction chamber (103) along with the nitrogen oxide polluted air. In the ozone reaction chamber (103), primary oxidation by ozone takes place, by which nitrogen oxide polluted air is brought into contact with the ozone to convert NO contained in the polluted air to $NO_2$. The nitrogen oxide polluted air from the ozone reaction chamber (103) in which primary oxidization is carried out by ozone becomes only, or substantially only, composed of $NO_2$ that has good reactivity and is easy to handle, thereby making the treatment of nitrogen oxide polluted air more effective at the later secondary oxidization by a catalyst.

As an ozone generator (102), devices such as ultraviolet lamps, dielectric-barrier discharge, cold plasma, etc. may be used. The ozone is supplied in a concentration exceeding the sum of a two-fold concentration of NO in the nitrogen oxide polluted air to be treated and a concentration of $NO_2$, wherein the concentration is based on a stoichiometric ratio. For example, the minimum concentration of ozone to be supplied can be calculated based on Equation 1 below:

$$Y=2A+B \qquad \text{[Equation 1]}$$

wherein Y represents the concentration of ozone to be supplied, A represents the concentration of NO contained in nitrogen oxide polluted air, and B represents the concentration of $NO_2$ contained in nitrogen oxide polluted air following oxidation of NO to $NO_2$.

In the ozone reaction chamber (103), the nitrogen oxide polluted air is reacted with ozone ($O_3$) supplied from the ozone generator (102), and thus all, or substantially all, NO contained in the nitrogen oxide polluted air is oxidized to $NO_2$.

The nitrogen oxide polluted air from the ozone reaction chamber (103) in which primary oxidization occurs by ozone and the residual ozone is transferred to a catalytic reaction chamber (104) to undergo secondary oxidization by oxygen radicals. In the catalytic reaction chamber, a catalyst (104) is used which is capable of being reacted with the residual ozone to decompose the same into oxygen and oxygen radicals. Suitable catalysts include any catalyst known to decompose into oxygen and oxygen radicals, such as catalysts based on $MnO_2$, NiO, CoO, CuO, $Fe_2O_3$, $V_2O_5$, and $AgO_2$. These catalysts may be used in a single metal oxide form as above or in the form of, e.g. $MnO_2$—CuO, $MnO_2$—$AgO_2$, NiO—CoO—$AgO_2$. In one embodiment of the present invention, a $MnO_2$ catalyst is used.

In the catalytic reaction chamber (104), the residual ozone is decomposed into oxygen and oxygen radicals via a reaction with the catalyst, and at the same time, the nitrogen oxide polluted air that only contains $NO_2$ by primary oxidization by ozone is reacted with the oxygen radicals produced above to oxidize $NO_2$ to $NO_3^-$. In the catalytic reaction chamber (104), secondary oxidization by oxygen radicals is carried out at a temperature of 0-100° C., for example at room temperature of 10-30° C. The cleaned air where nitrogen oxides have been completely, or substantially completely, removed in the catalytic reaction chamber (104) is emitted through an outlet as it is or passed through a wet scrubber to react $NO_3^-$ in the cleaned air with water to remove the same in the form of $HNO_3$.

The nitrogen oxide treatment apparatus according to the present invention, comprising a water trap, an ozone generator, an ozone reaction chamber, and a catalytic reaction chamber, is relatively simple and cost-efficient. In addition, it does not cause secondary air pollution resulting from the use of ozone because the ozone is completely, or substantially completely, decomposed during the process, and can effectively treat nitrogen oxides that are harmful to human. Accordingly, the nitrogen oxide treatment apparatus according to the present invention can be usefully applied in the treatment of low concentration of nitrogen oxide polluted air emitted from interior residential environments, as well as in the treatment of high concentration of nitrogen oxide polluted air emitted from industrial facilities such as power plants, incinerators, and chemical plants.

In the working examples of the invention, an experiment for analyzing the treating efficiency of the nitrogen oxide treatment apparatus using an ozone and catalyst hybrid system according to the present invention was carried out as follows.

First, 5,000 ppm of NO ($N_2$ equilibrium) was mixed with pure air to prepare test nitrogen oxide polluted air where NO is maintained at a concentration of 10 ppm. The test nitrogen oxide polluted air prepared was thus passed through a water trap (101) filled with silica gels for the removal of moisture and the moisture-removed test nitrogen oxide polluted air was then transferred to an ozone reaction chamber (103). Simultaneously, ozone was generated at a range of 50-150 ppm by adjusting the supplied voltages using a dielectric-barrier discharge (DBD) ozone generator (102) and then the ozone thus generated was transferred to the ozone reaction chamber (103). The nitrogen oxide polluted air from the ozone reaction chamber (103) was passed through a catalytic reaction chamber (104) employing a $MnO_2$ catalyst at an air flow of 0.3 $m^3$/hr (space velocity: 10,000/h, retention time: 0.2 sec). The air flow of nitrogen oxide polluted air introduced into each test apparatus was controlled using a MFC (mass flow rate controller, MKS). The concentrations of ozone and $NO_2$ contained in the final reaction air from the catalytic reaction chamber (104) were measured using an ozone monitor (Model 1300, DYLEX) and a gas analyzer (GreenLine, MK2). The nitrogen oxide removal ratio was calculated in accordance with Equation 2 below:

$$NO_x \text{ removal ratio} = \{[NO_x \text{ inflow}] - [NO_x \text{ emission}]\} / NO_x \text{ inflow} \qquad \text{[Equation 2]}$$

Meanwhile, in order to analyze the presence of nitrogen oxide in the cleaned air emitted from the treatment apparatus described above, in the bottom of the catalytic reaction chamber (104) was built an impinger using purified water in three layers. The cleaned air emitted from the catalytic reaction chamber (104) was passed through the impinger at an air flow of around 0.06 $m^3$/hour for a period of 20 min to undergo a capturing test. For the sake of enhancing its efficiency, the impinger was built in a box filled with ice, where the temperature of the device was maintained at no greater than 5° C. After the completion of capturing, the liquid taken from the impinger was analyzed using ion chromatography.

Figure 2:
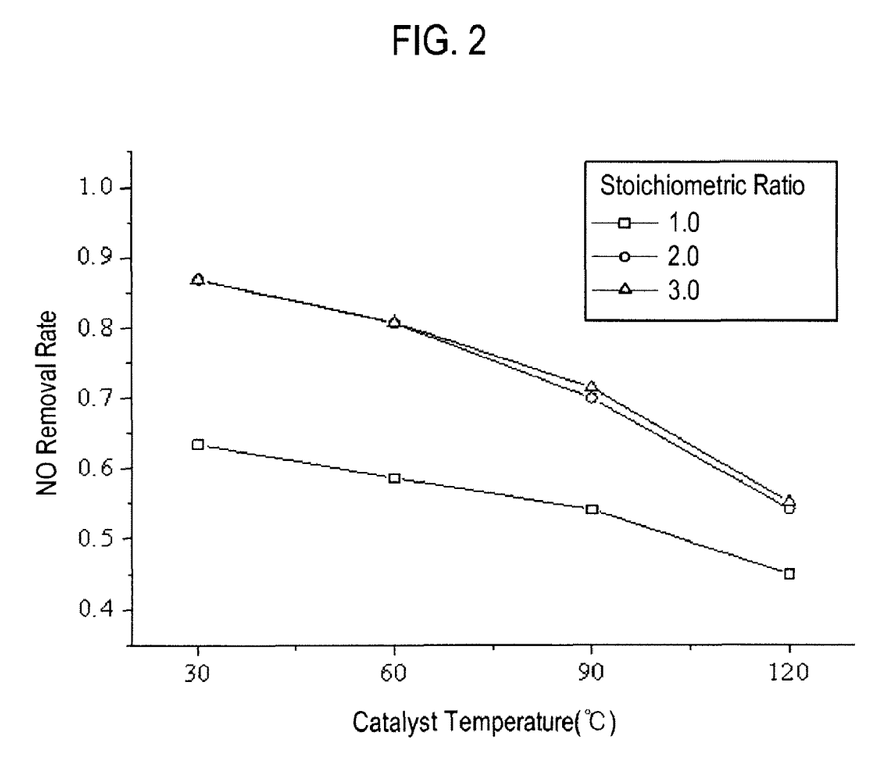
FIG. 2 is a graph illustrating NO removal ratios with respect to temperatures depending on the concentrations of ozone to be supplied to the $MnO_2$ catalytic reaction chamber of the nitrogen oxide treatment apparatus using an ozone and catalyst hybrid system in accordance with the present invention.
Figure 3:
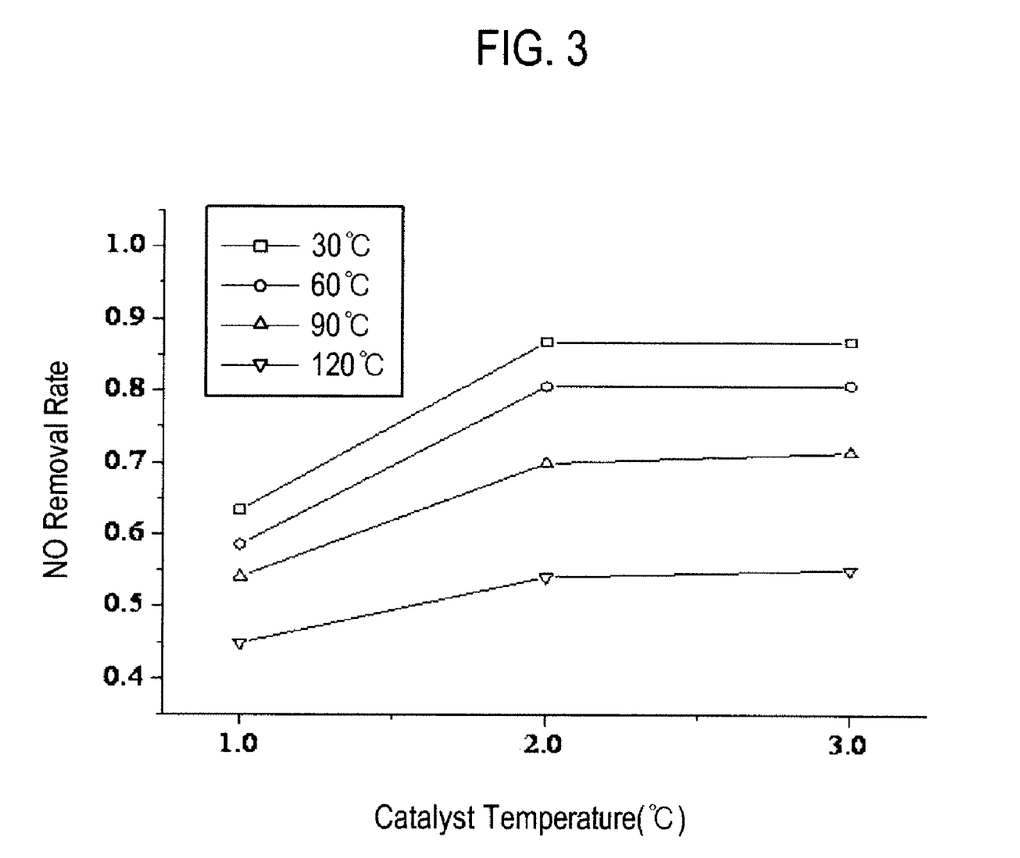
FIG. 3 is a graph illustrating NO removal ratios with respect to temperatures depending on the concentrations of ozone to be supplied to the $MnO_2$ catalytic reaction chamber of the nitrogen oxide treatment apparatus using an ozone and catalyst hybrid system in accordance with the present invention.

FIGS. 2 and 3 are graphs illustrating NO removal ratios with respect to temperatures when ozone is supplied varying the stoichiometric ratio of ozone to NO in the test nitrogen oxide polluted air so as to be 1.0, 2.0, and 3.0 (ozone concentrations of 50, 100, and 150 ppm, respectively) while the concentration of NO was maintained at 50 ppm. As shown in FIGS. 2 and 3, when both NO and ozone are supplied in an amount of 50 ppm, these are reacted with each other at a ratio of 1:1 to oxidize NO to $NO_2$ and during the reaction ozone is consumed. Accordingly, in this case, as ozone substantially was no longer present to be decomposed by a $MnO_2$ catalyst to generate oxygen radicals for use in the oxidization of $NO_2$, $NO_2$ was absorbed to the $MnO_2$ catalytic reaction chamber (see FIG. 4), instead of being oxidized to $NO_3^-$, whereby the removal ratio of nitrogen oxides was lowered. In this case, the higher the temperature in the $MnO_2$ catalytic reaction chamber, the lower the removal ratio of nitrogen oxides.

Meanwhile, when ozone was supplied in an amount of 100 ppm, 50 ppm of ozone was reacted with 50 ppm of NO to produce $NO_2$ and the remaining 50 ppm of ozone was decomposed into oxygen and oxygen radicals on the surface of the $MnO_2$ catalytic reaction chamber. The oxygen radicals thus produced were reacted with $NO_2$ to finally generate $NO_3^-$, whereby a high nitrogen oxide removal ratio was shown. Also in this case, the removal ratio of nitrogen oxide decreased with increasing temperatures in the $MnO_2$ catalytic reaction chamber. In addition, in the case where ozone was supplied in a concentration of 150 ppm, the nitrogen oxide removal ratio was almost the same as in the case of 100 ppm. It can be understood from the above results that although more than 100 ppm of ozone is supplied to the $MnO_2$ catalytic reaction chamber and then a lot of oxygen radicals are generated, it would not influence the removal ratio of nitrogen oxide.

Accordingly, it can be confirmed from the above results that in the nitrogen oxide treatment in accordance with the present invention, it is ideal that ozone should be supplied in a concentration corresponding to the sum of a two-fold concentration of NO in the nitrogen oxide polluted air to be treated and a concentration of $NO_2$, based on a stoichiometric ratio.

Figure 4:
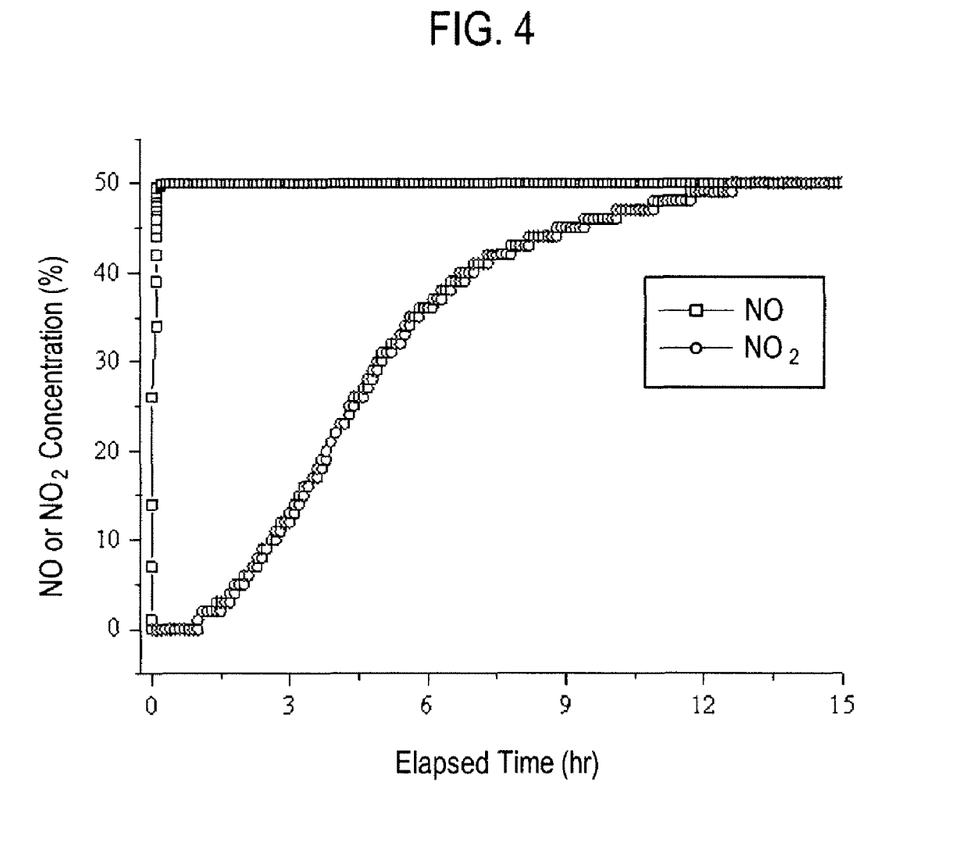
FIG. 4 is a graph illustrating NO and $NO_2$ removal ratios when NO and $NO_2$ are injected into the $MnO_2$ catalytic reaction chamber at the same concentration under conditions where no ozone is supplied in the nitrogen oxide treatment apparatus using an ozone and catalyst hybrid system in accordance with the present invention.

FIG. 4 is a graph illustrating the results of the measurement of NO and $NO_2$ emission with respect to time zones after NO and $NO_2$ were injected into the $MnO_2$ catalytic reaction chamber at the same concentration (50 ppm) where no ozone was supplied. The results show whether or not NO and $NO_2$ are absorbed to the $MnO_2$ catalytic reaction chamber. As shown in FIG. 4, NO was not absorbed to the $MnO_2$ catalytic reaction chamber and was emitted in the amount as injected. On the other hand, $NO_2$ was absorbed to the $MnO_2$ catalytic reaction chamber in the early stage and thus it was hardly emitted, but as $NO_2$ was absorbed close to saturation with the passage of time, the emission increased. The above result shows that in the $MnO_2$ catalytic reaction chamber, $NO_2$ was treated by absorption, not by chemical reaction. Accordingly, although the $NO_2$ treatment is possible via absorption to the $MnO_2$ catalytic reaction chamber, when a certain level is reached, the catalyst induced absorption no longer occurs and the $NO_2$ emission takes place.

Figure 5:
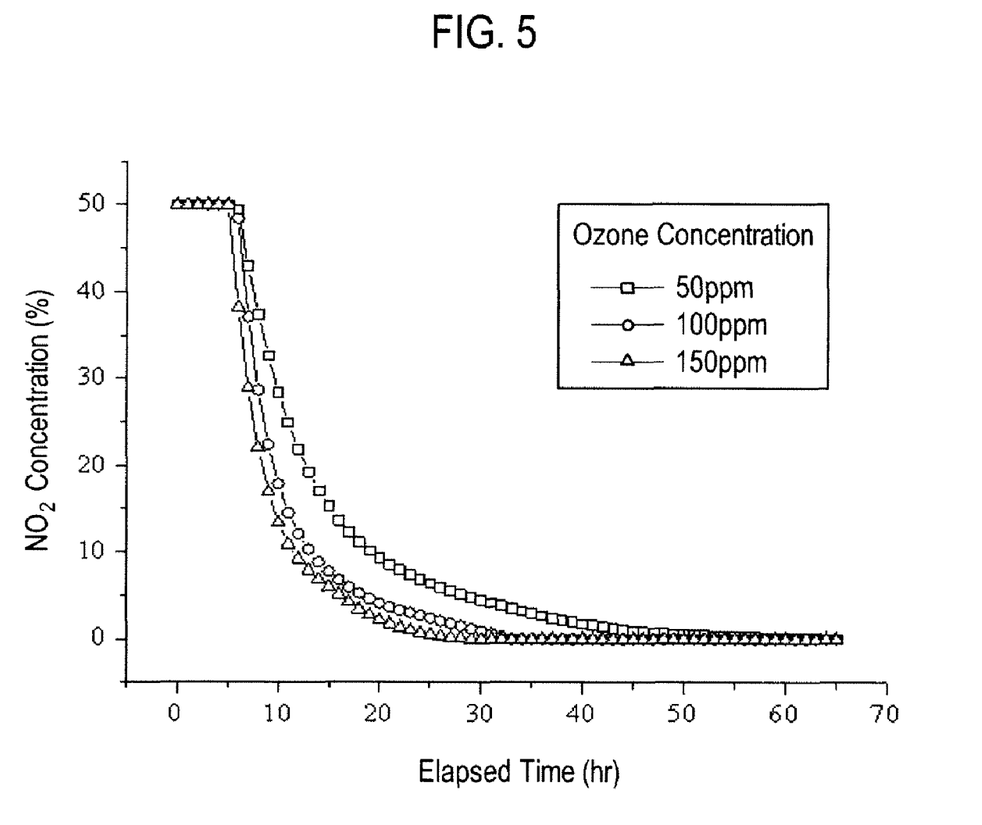
FIG. 5 is a graph illustrating $NO_2$ removal ratios depending on the concentrations of ozone to be supplied to the $MnO_2$ catalytic reaction chamber of the nitrogen oxide treatment apparatus using an ozone and catalyst hybrid system in accordance with the present invention.

FIG. 5 is a graph illustrating the concentrations of $NO_2$ emitted from the $MnO_2$ catalytic reaction chamber after ozone is supplied at concentrations of 50, 100, and 150 ppm to the $MnO_2$ catalytic reaction chamber in which $NO_2$ (50 ppm) is supplied for a long period and absorbed to saturation as in FIG. 4. As shown in FIG. 5, $NO_2$ was absorbed to saturation before ozone was supplied and it was emitted in an amount as supplied to the $MnO_2$ catalytic reaction chamber. Once ozone was supplied, the $NO_2$ emission significantly decreased. This is because ozone decomposed into oxygen and oxygen radicals, and the generated oxygen radicals detached the absorbed $NO_2$ from the $MnO_2$ catalytic reaction chamber and converted it into $NO_3^-$. The concentration of $NO_2$ emitted decreased with increasing concentrations of ozone supplied.

Figure 6:
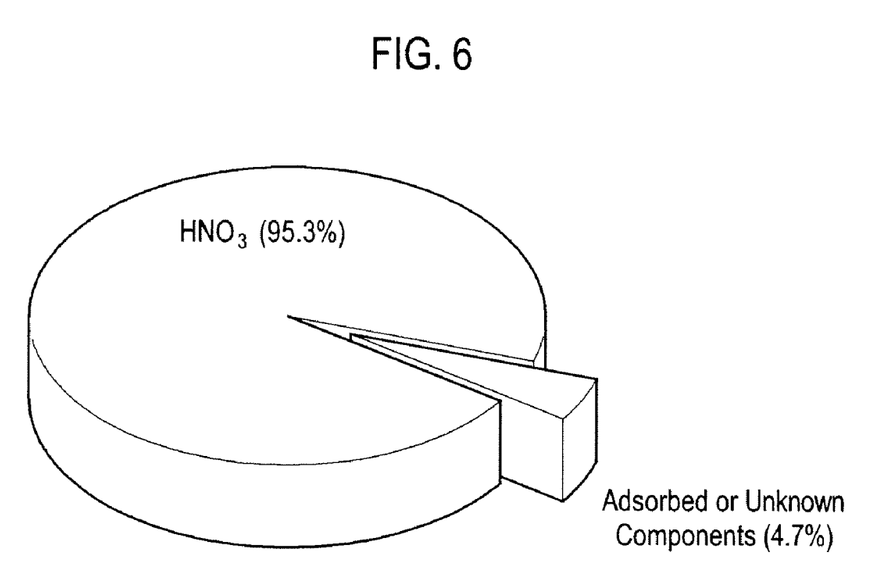
FIG. 6 illustrates the results from ion chromatography analysis of the composition of the cleaned air emitted from the nitrogen oxide treatment apparatus using an ozone and catalyst hybrid system in accordance with the present invention.

FIG. 6 illustrates the result from ion chromatography analysis of the composition of the liquid taken from the impinger capturing the cleaned air emitted from the $MnO_2$ catalytic reaction chamber. According to the result, no nitrogen oxides, such as NO or $NO_2$, were detected and more than 95% of the liquid was $HNO_3$. The $HNO_3$ detected in the liquid was produced by reacting $NO_3^-$ in the cleaned air with water contained in the impinger. Accordingly, it is understood from the above result that the ozone and catalyst hybrid system according to the present invention oxidized all, or substantially all, of NO and $NO_2$ in the nitrogen oxide polluted air into $NO_3^-$ forms.

As shown above, the specific embodiments of the present invention have been described in detail. However, the embodiments are no more than desirable embodiments to those skilled in the art and the scope of the present invention is not to be limited by the specific embodiments. Accordingly, the scope of the invention should be defined by the appended claims and equivalents thereof.

What is claimed:

1. A method for the treatment of nitrogen oxides using an ozone and catalyst hybrid system, comprising the steps of:
   1) removing moisture from the nitrogen oxide polluted air to be treated;
   2) contacting the moisture-removed nitrogen oxide polluted air with ozone to oxidize NO in said polluted air to $NO_2$, the ozone being supplied in a concentration not less than the sum of a two-fold concentration of NO in the nitrogen oxide polluted air to be treated and a concentration of $NO_2$, wherein said concentration is based on a stoichiometric ratio; and
   3) reacting residual ozone with a catalyst to generate oxygen radicals, and at the same time reacting the generated oxygen radicals with the nitrogen oxide polluted air from step 2) to oxidize $NO_2$ in the polluted air to $NO_3^-$.

2. The method of claim 1, characterized in that in step 1) the moisture is removed such that the nitrogen oxide polluted air contains 0.1-1.0% moisture.

3. The method of claim 1, characterized in that the ozone in step 2) is generated using an apparatus selected from the group consisting of an ultraviolet lamp, dielectric-barrier discharge, and cold plasma.

4. The method of claim 1, characterized in that the catalyst in step 3) is a metal oxide catalyst selected from the group consisting of $MnO_2$, $NiO$, $CoO$, $CuO$, $Fe_2O_3$, $V_2O_5$, and $AgO_2$.

5. The method of claim 1, characterized in that the reacting in step 3) is carried out in a temperature ranging from 0 to 100° C.

* * * * *